United States Patent
Burton

(10) Patent No.: US 6,487,185 B1
(45) Date of Patent: Nov. 26, 2002

(54) FRAME ERASURE FOR DIGITAL DATA TRANSMISSION SYSTEMS

(75) Inventor: Mark Burton, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/346,927

(22) Filed: Jul. 2, 1999

(30) Foreign Application Priority Data

Jul. 3, 1998 (GB) .............................................. 9814351

(51) Int. Cl.$^7$ ................................................. H04Q 7/00
(52) U.S. Cl. ........................ 370/332; 370/347; 375/224
(58) Field of Search ................................ 370/332, 347; 375/224, 225, 226, 227, 228, 346; 455/226.1, 226.2, 226.3, 67.1, 67.3, 63

(56) References Cited

U.S. PATENT DOCUMENTS 5,557,639 A  *  9/1996  Heikkila et al. ......... 455/226.1

* cited by examiner

Primary Examiner—Lester G. Kincaid
(74) Attorney, Agent, or Firm—Sughrue Mion, PLLC

(57) ABSTRACT

A method of improving frame erasure performance, in particular for slow frequency hopping channels with cyclic co-channel interference, by selection of the most suitable PBER threshold from a range of PBER thresholds. A burst quality metric is assigned to each burst in a frame and the bursts are then ranked in the order of the values of the assigned quality metrics. The differences in the metrics between successive bursts in the ranked order are measured. The position in the ranked order of the largest difference between bursts ($d_{MAX}$) is used in the selection of the most suitable PBER threshold.

8 Claims, 2 Drawing Sheets

FRAME ERASURE FOR DIGITAL DATA TRANSMISSION SYSTEMS

BACKGROUND OF THE INVENTION

This invention relates to digital data transmission and in particular it relates to digital data decoders. The following description is based on the GSM cellular communication s system for which the invention is of particular utility. It will be apparent to those skilled in the art, however that the invention may be applied to other systems of digital data transmission.

Reference is made to U.S. Pat. Nos. 5,598,506 and 5,596,678 to Wigren et al; U.S. Pat. No. 5,557,639 to Heikkila; and "MOBILE RADIO COMMUNICATIONS" published by John Wiley & Sons, Raymond Steele (Ed.) for a description of the prior art and technological background. The European Telecommunications Standards Institute Publication TS GSM 5/03 Digital cellular telecommunications system (Phase 2+); Channel Coding, version 5.3.1 is also relevant.

The following abbreviations are used herein:
GSM: Global System for Mobile communications (formerly Groupe Special Mobile);
BCCCH: Broadcast Control Channel;
TCH/F: Traffic Channel/Full Rate;
TCH/FS: Traffic Channel/Full Rate for Speech;
CRC: Cyclic Redundancy Check; and
PBER: Pseudo Bit Error Rate The GSM cellular communications system uses the Full Rate speech codec as default. The full rate speech codec encodes 160, 8 kHz samples into 260 bits containing 76 parameters. These 260 bits are divided into two groups based on their subjective importance to speech quality.

The 78 least important bits are known as class II bits and are unprotected. Corruption of these class II bits have little audible effect on speech quality. The most important 182 bits are known as class I bits and are protected by a half rate convolutional code.

The class I bits are further subdivided into Ia and Ib, such that the most significant 50 bits (Ia) are additionally protected by a 3 bit cyclic redundancy check (CRC). In order to prevent unpleasant audio artifacts on the speech any frame erasure mechanism must detect all frames with class Ia errors and frames with more than a certain number of class Ib errors, as precisely and efficiently as possible for all propagation channel types.

Network Operators wish to maximize the capacity and quality of their networks, One of the ways in which this can be achieved is to employ slow frequency hopping. A slow frequency hopping channel follows a cyclic pseudo-random hopping sequence, each burst being transmitted on a frequency which is different from the frequency of the previous burst. A performance gain is achieved from the frequency diversity of the hopping sequence.

The use of slow frequency hopping also allows greater re-use of the frequencies allocated to an Network Operator, thereby increasing the capacity available. One side effect of slow hopping and frequency re-use is the creation of a special class of propagation channels, known as Telstra channels, so called because the Australian Network Operator Telstra implemented its own mobile station (MS) performance test for this type of channel.

This class of propagation channel (Telstra) is characterized by a slow frequency hopping channel, hopping across n (typically n=4) frequencies, one of which has a high level of co-channel interference present (typically −10 to −20 dB) which may arise from an adjacent cell's BCCH broadcast or traffic channel, The effect of this interference is that for the burst affected by it, the probability of the bits being in error tends toward 50% (i.e. essentially random) and the other n−1 frequencies have a low probability of error.

Because of the interleaving and re-ordering of the TCH/FS channel, these erroneous bits are evenly distributed across the whole speech frame, interlaced with the correct bits from the other bursts. This is in direct contrast to ordinary (non-Telstra like) channels where all bursts contributing to the speech frame are equally likely to contain errors so that after the interleaving has been removed and re-ordering performed, it is likely that non-evenly distributed bits in the encoded speech frame will be in error.

The $r=\frac{1}{2}$, K=5 code used in this GSM coding scheme is powerful enough successfully to correct errors on a Telstra channel. This behavior was originally noted by Telstra for a 1:4 hopping channel.

The conventional frame erasure algorithm used for the GSM TCH/FS channel is composed of two individual tests: a 3 bit CRC check and a pseudo-bit error rate (PBER) threshold. The PBER is calculated by re-encoding the decoded class I bits and comparing them, bit by bit, with the original received bits. The CRC check is computed over the class Ia bits of the speech frame. The number of estimated errors is calculated for all of the encoded class I bits. The frame erasure algorithm proceeds as follows:

1. Convolutionally decode the 378 encoded class I symbols to give the 189 class I bits.
2. Perform a CRC check on the class Ia bits. If the CRC check fails, mark the frame for erasure.
3. Re-encode the 189 class Ia bits and then perform a bit by bit comparison between the re-encoded symbols and the original received symbols, to compute the number of differences.
4. If the number of differences exceeds the PBER threshold then the frame is marked for erasure.

This conventional algorithm works well for "non-Telstra like" channels. However, the performance of the CRC check is dependent on the PBER threshold value. The lower the PBER threshold, the more reliable the CRC check becomes. A PBER threshold value typically of between 45–60 is required.

The conventional algorithm does not work well for "Telstra like" channels because they require too high for the CRC check to be reliable for use with non-Telstra channels. This is because the convolutional code can correct a larger number of errors for a Telstra channel due to the even, periodic distribution of errors and if the PBER threshold is set too low for "Telstra like" channels, too many error free speech frames will be erased.

SUMMARY OF THE INVENTION

Objects of the present invention are better frame erasure performance for Telstra 1:3 and 1:4 channels and better error checking of class Ib bits for all channels.

According to the invention, there is provided a method of identifying a frame for erasure in a digital data transmission system by estimating the quality of each burst in a series of bursts ranking each burst according to quality estimates to form a ranked series of bursts and using the ranking position and measured value of the largest difference in quality estimates between successive bursts in the ranked series of bursts to set a PBER threshold level.

BRIEF DESCRIPTION OF THE DRAWING

One example of the invention for the will now be described for the GSM TCH/FS channel, with reference to the figures in which.

DESCRIPTION OF PREFERRED EMBODIMENT

Figure 3:
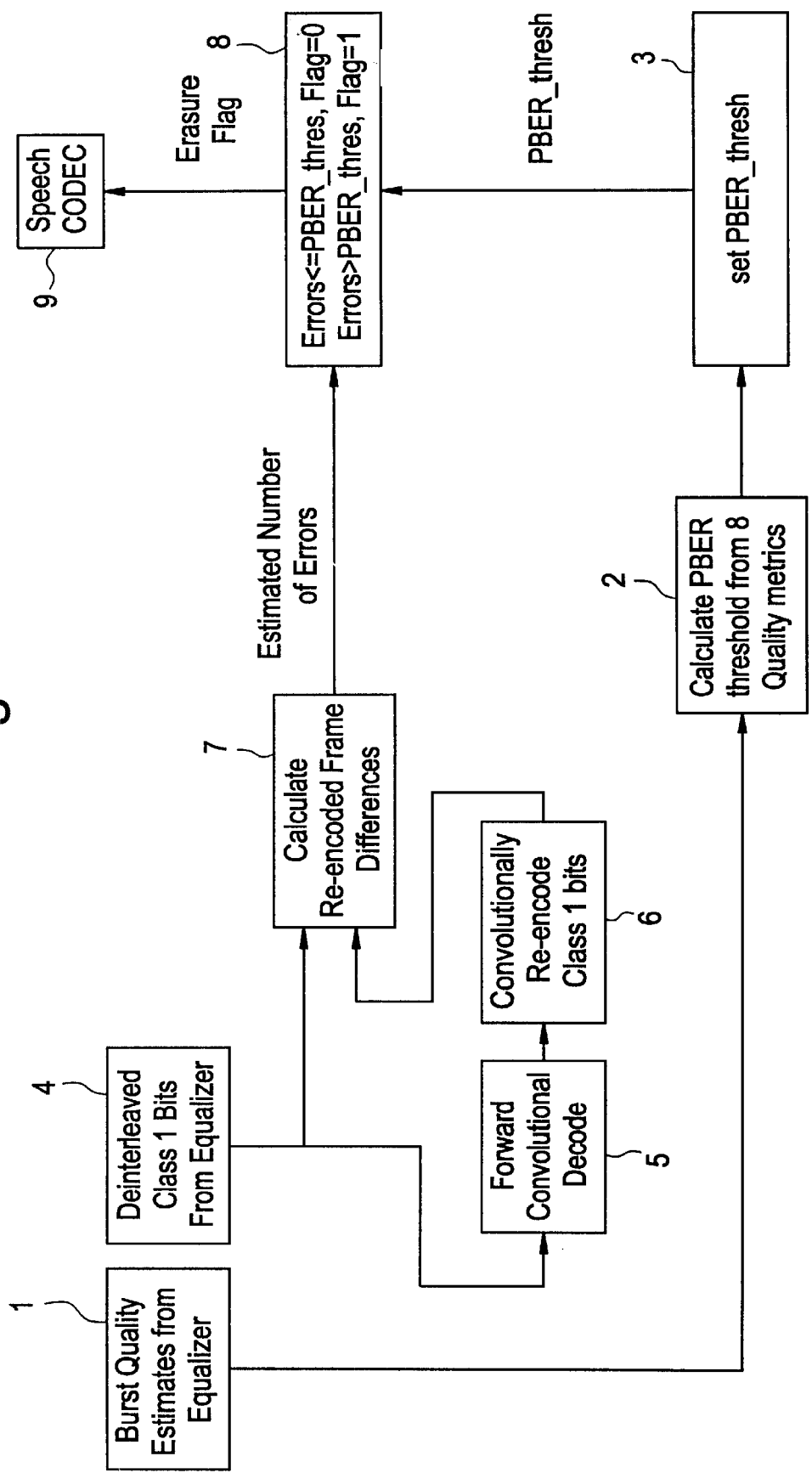
FIG. 3 is a block diagram illustrating the step search decoding mechanism, and Table 1 presents typical PBER threshold values.

With reference to FIG. 3, a frame erasure method according to the prior art is illustrated in blocks 3 and 9. The de-interleaved class I bits from the equaliser 4 are convolutionally decoded in 5 and a CRC check performed on the convolutionally decoded class Ia bits. If the CRC check fails then the frame is marked for erasure. The 182 decoded class I bits +3 CRC check bits +4 tail bits are re-encoded in 6 and the 378 re-encoded symbols are compared bit by bit in 7 with the originally received encoded symbols. The number of differences is then computed. If the number of differences exceeds the selected PBER threshold value in 8, then the frame is marked for erasure.

The Step Search (SS) algorithm illustrated in FIG. 3 makes use of information normally available from the equalizer to prove an adaptive PBER threshold better suited to accommodate Telstra like channels. The information used is a burst quality metric.

For a particular burst this metric will give an estimate of the quality of the demodulated received burst. In this example a poor quality burst has a high burst quality metric and a good quality burst has a low burst quality metric.

Figure 1:
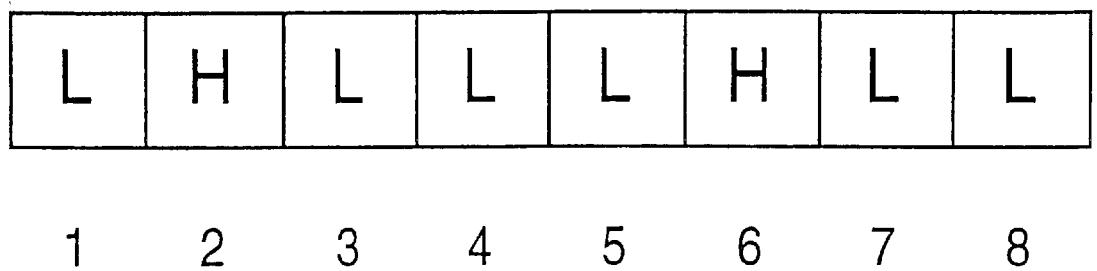
FIG. 1 illustrates a series of burst quality metrics in order of the received bursts for a 1 in 3 Telstra channel.

For a Telstra like channel, examination of the burst quality estimates of the eight bursts from which the current frame was constructed will reveal a number of low value burst metrics (L) corresponding to the good bursts and a number of high value burst metrics (H) corresponding to poor quality Telstra corrupted bursts. Consider, for example, a channel with a 1 in 4 cyclic co-channel interferer. The received burst quality metrics should periodically (1 in every 4) show a high value, indicating the corrupted bursts (see FIG. 1).

The burst quality estimates are supplied by the equaliser at 1 in FIG. 3 and a calculation in 2 based on the eight quality metrics establishes the most suitable PBER to be set in 3.

Figure 2:
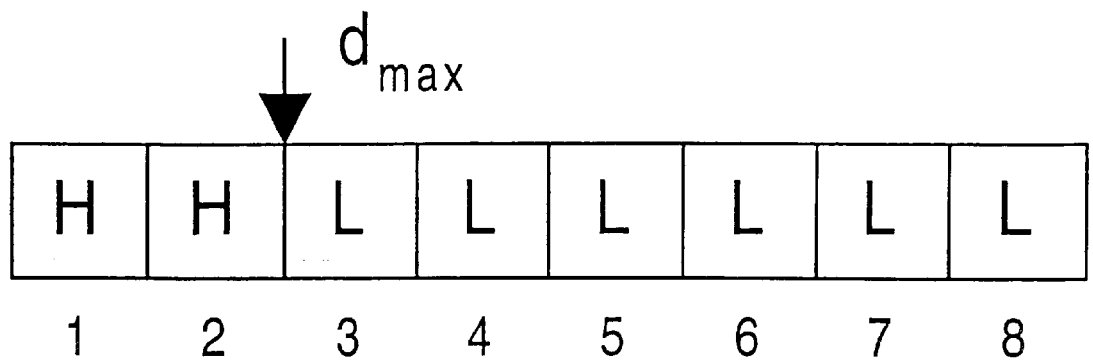
FIG. 2 illustrates a ranked series of burst quality metrics for 1:3 Telstra channel.

The PBER threshold value in 3 is selected as follows. The eight burst quality estimates corresponding to the eight bursts which have been de-interleaved to create the current speech frame are obtained and ranked in descending order of quality metric as shown in FIG. 2. The maximum difference $d_{MAX}$ between two successive burst quality estimates is identified. The position $d_{MAX}$ illustrated in FIG. 2 is between ranked bursts 2 and 3. The value of $d_{MAX}$ is then compared with a preset threshold and if the value of $d_{MAX}$ is less than the preset threshold $d_{thres}$ (e.g. 10) then the PBER threshold is set to a default value $PBER_{def}$ (e.g. 45).

When the value of $d_{MAX}$ exceeds the preset threshold the number N of poor bursts present is calculated. As illustrated in FIG. 2 the number of poor bursts may be inferred from the location of $d_{MAX}$ in the ranked series of bursts. The PBER threshold value is then set in accordance with the number N of poor quality bursts. Table 1 gives examples of the PBER threshold setting for calculated numbers N. These parameters are chosen for achievement of optimal performance.

TABLE 1

| N | PBER threshold |
|---|---|
| 1 | PBER_1 (e.g. 50) |
| 2 | PBER_2 (e.g. 60) |
| 3 | PBER_3 (e.g. 80) |
| 4, 5, 6, 7 | PBER_4 (e.g. 90) |

Where: PBERdef ≦ PBER_1 ≦ PBER_2 ≦ PBER_3 ≦ PBER_4

When the PBER threshold is set in 3, the number of errors in the 189 encoded symbols is estimated by re-encoding the 189 decoded class I bits. The 189 re-encoded symbols are compared, bit by bit, with the originally received encoded symbols and the number of differences computed. If in 8, the number of differences computed in 7 exceeds the PBER threshold set in 3, then the frame is marked for erasure.

The step search method for frame erasure as described herein removes the dependency on a single PBER threshold which dependency is a compromise between Telstra and non-Telstra channels. The step search method detects a Telstra type condition on a per speech frame basis by looking for the characteristic distribution of burst quality metrics for the eight bursts contributing to a speech frame.

What is claimed is:

1. A method of identifying a frame for erasure in a digital data transmission system by use of an adaptive pseudo bit error rate (PBER) threshold, comprising:

estimating the quality of each burst in a series of bursts;

ranking each burst according to the quality estimates to form a ranked series of bursts;

measuring a value of the largest difference in the quality estimates between successive bursts in the ranked series of bursts; and setting the PBER threshold level based on a position in the ranked order and on the measured value.

2. A method of identifying a frame for erasure as in claim 1, wherein the digital data transmission system is a Global System for Mobile (GSM) cellular communications system.

3. A method of identifying a frame for erasure as in claim 1, further comprising:

calculating a number of poor quality bursts in the ranked series of bursts, wherein said step of setting the PBER threshold is based on the number of the poor quality bursts in the ranked series of bursts.

4. A method of identifying a frame for erasure as in claim 3, wherein the digital data transmission system is a GSM cellular communications system.

5. A method of identifying a frame for erasure as in claim 1, further comprising:

determining whether the largest difference in the quality estimates is less than a pre-set value, wherein the PBER threshold level is set to a default level when the largest difference in the quality estimates is less than or equal to the pre-set value.

6. A method of identifying a frame for erasure as in claim 5, wherein the digital data transmission system is a GSM cellular communications system.

7. A method of identifying a frame for erasure as in claim 5, further comprising:

calculating a number of poor quality bursts in the ranked series of bursts, wherein said step of setting the PBER threshold is based on the number of the poor quality bursts in the ranked series of bursts.

8. A method of identifying a frame for erasure as in claim 7, wherein the digital data transmission system is a GSM cellular communications system.

* * * * *

UNITED STATES PATENT AND TRADEMARK OFFICE
CERTIFICATE OF CORRECTION

PATENT NO.     : 6,487,185 B1
DATED          : November 26, 2002
INVENTOR(S)    : Mark Burton It is certified that error appears in the above-identified patent and that said Letters Patent is hereby corrected as shown below:

<u>Column 1,</u>
Line 24, delete "BCCCH" and insert -- BCCH --

Signed and Sealed this

Twelfth Day of August, 2003

JAMES E. ROGAN
*Director of the United States Patent and Trademark Office*